(12) United States Patent
Kim

(10) Patent No.: US 7,962,930 B2
(45) Date of Patent: Jun. 14, 2011

(54) BROADCASTING RECEIVING APPARATUS AND DISPLAYING METHOD OF USER INTERFACE FOR SETTING PARENTAL LOCK

(75) Inventor: Joon-hwan Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 455 days.

(21) Appl. No.: 11/704,992

(22) Filed: Feb. 12, 2007

(65) Prior Publication Data

US 2007/0220542 A1 Sep. 20, 2007

(30) Foreign Application Priority Data

Mar. 3, 2006 (KR) .................. 10-2006-0020512

(51) Int. Cl.
*H04N 7/16* (2006.01)
(52) U.S. Cl. ............................ 725/28; 725/40
(58) Field of Classification Search .......... 725/25–31, 725/37–61; 715/700–867
See application file for complete search history.

(56) References Cited

U.S. PATENT DOCUMENTS

| | | | |
|---|---|---|---|
| 5,973,683 A | | 10/1999 | Cragun et al. |
| 6,025,869 A | * | 2/2000 | Stas et al. .................. 725/28 |
| 6,898,762 B2 | * | 5/2005 | Ellis et al. .................. 715/716 |
| 2004/0040034 A1 | | 2/2004 | Sullivan et al. |
| 2005/0028191 A1 | * | 2/2005 | Sullivan et al. .................. 725/28 |
| 2005/0114791 A1 | * | 5/2005 | Bollenbacher et al. ....... 715/787 |

FOREIGN PATENT DOCUMENTS

JP 2001-333343 A 11/2001

OTHER PUBLICATIONS

EIA-766, U.S. Region Rating Table (RRT) and Content Advisory Descriptor for Transport of Content Advisory Information Using ATSC N65 Program and System Information Protocol (PSIP) (Sep. 1998, TK 5102.5, .E44 1998, c.1).*

* cited by examiner

*Primary Examiner* — Andrew Y Koenig
*Assistant Examiner* — Aklil Tesfaye
(74) *Attorney, Agent, or Firm* — Sughrue Mion, PLLC

(57) ABSTRACT

A broadcasting receiving apparatus includes: a broadcasting receiver for receiving downloadable parental rating definition-related data transmitted from an outside source; a data storage for storing the parental rating definition-related data; a user interface (UI) generator for generating a UI for parental lock setup; and a controller for controlling the UI generator to indicate upper item data of the parental rating definition-related data in a first axis direction of the UI and arrange lower item data corresponding to the upper item data in a second axis direction which is different from the first axis direction.

41 Claims, 5 Drawing Sheets

FIG. 2

| Rating Value ↓ | Dimensions → | | | | |
|---|---|---|---|---|---|
| | 0 | 1 | 2 | ... | Dimensions_defined |
| 1 | | | | | |
| 2 | | | | | |
| ⋮ | | | | | |
| Value_defined | | | | | |

BROADCASTING RECEIVING APPARATUS AND DISPLAYING METHOD OF USER INTERFACE FOR SETTING PARENTAL LOCK

CROSS-REFERENCE TO RELATED APPLICATIONS

This application claims priority from Korean Patent Application No. 10-2006-0020512, filed on Mar. 3, 2006, in the Korean Intellectual Property Office, the disclosure of which is incorporated herein by reference in its entirety.

BACKGROUND OF THE INVENTION

1. Field of the Invention

Apparatuses and methods consistent with the present invention relate to a broadcasting receiving apparatus and a displaying method of a user interface for setting a parental lock, and more particularly, to a broadcasting receiving apparatus, which is capable of setting a parental lock according to data related to parental rating definitions transmitted from an outside, and a displaying method of a user interface for setting the parental lock.

2. Description of the Related Art

In general, a broadcasting signal includes additional data, for example, parental rating information of a broadcasting program, in addition to a video signal and an audio signal. A parental rating of a broadcasting program has been introduced to set program viewing compatibility according to age, maturity and the like of a viewer. A broadcasting receiving apparatus having a parental lock function performs the parental lock function depending on whether parental rating information of a received broadcasting program corresponds to a rating preset by a user.

In other words, the broadcasting receiving apparatus provides a user interface (UI) to allow the user to set the parental lock function and blocks or permits viewers, such as children, to watch a broadcasting program depending on a parental lock rating set by the user.

According to the Advanced Television Systems Committee (ATSC) broadcasting standards, since there is no room for change of parental rating definitions, a known parental rating definition was reflected to set a parental lock function in the course of manufacturing the broadcasting receiving apparatus.

In recent years, in connection with the parental rating, the Federal Communications Commission (FCC) of the United States has published the rules that broadcasting receiving apparatuses shall reflect the "Downloadable U.S. Regional Rating System." According to the rules, broadcasters may transmit rating region tables (RRTs) as parental rating definition-related data variably to the broadcasting receiving apparatuses, if they want to do so, and the broadcasting receiving apparatuses have to provide the transmitted RRT information to users, allowing them to recognize the RRT information and set a parental lock function.

According to the rules, the parental rating definition-related data may have at least one independent dimension value and a rating value dependent on the dimension value. The broadcasting receiving apparatuses may receive a maximum of 41 (255, in theory) dimension values and a maximum of 15 rating values.

Since the parental rating definition-related data may include an enormous amount of information, it may be difficult for a user to recognize parental rating definition-related data and thus, to set the parental lock function.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a broadcasting receiving apparatus, which is capable of facilitating user's recognition of parental rating definition-related data transmitted along with broadcasting signals and more conveniently setting a parental lock function according to the parental rating definition-related data, and a displaying method of a user interface for setting the parental lock function.

According to an aspect of the present invention, there is provided a broadcasting receiving apparatus including: a broadcasting receiver for receiving downloadable parental rating definition-related data transmitted; a data storage for storing the parental rating definition-related data; a UI generator for generating a UI for parental lock setup; and a controller for controlling the UI generator to indicate upper item data of the parental rating definition-related data in a first axis direction of the UI and arrange lower item data corresponding to the upper item data in a second axis direction different from the first axis direction.

According to an aspect of the invention, the controller controls the UI generator to indicate information on a rank of the upper item data for all received upper item data in one area of the UI.

According to an aspect of the invention, if there exist other upper item data, which are not indicated in the UI, of the stored parental rating definition-related data, the controller controls the UI generator to indicate a first extension indicating item informing the existence of the other upper item data and having (+) or (−) direction of the first axis.

According to an aspect of the invention, if there exist other lower item data, which are not currently indicated in the UI, of the lower item data corresponding to the upper item data indicated in the UI, the controller controls the UI generator to indicate a second extension indicator informing the existence of the other upper item data and having (+) or (−) direction of the second axis.

According to an aspect of the invention, the broadcasting receiving apparatus further comprises a user input unit for directing and/or selecting items indicated in the UI.

According to an aspect of the invention, when an extension of the upper item data is selected through the user input unit, the controller controls the UI generator to indicate next upper item data corresponding to the selection in the first axis direction and arrange and indicate lower item data corresponding to the indicated upper item data in the second axis direction.

According to an aspect of the invention, when an extension of the lower item data is selected through the user input unit, the controller controls the UI generator to arrange and indicate next lower item data corresponding to the selection in the second axis direction.

According to an aspect of the invention, the controller controls the UI generator to indicate detailed information on lower item data directed by the user input unit in one area of the UI.

According to an aspect of the invention, the first axis comprises a horizontal axis and the second axis comprises a vertical axis, and the upper item data comprise dimension values and the lower item data comprise rating values.

According to an aspect of the invention, the controller controls the UI generator to indicate items for selecting viewing block or allowance of the rating values indicated in the UI, and set a viewing block function in response to a rating value with the viewing block or allowance selected through the user input unit.

The foregoing and/or other aspects provide a displaying method of a UI for setting a parental lock, comprising: storing downloadable parental rating definition-related data transmitted from an outside source; and displaying a UI picture with upper item data of the parental rating definition-related data indicated in a first axis direction of a UI picture and with lower item data corresponding to the upper item data arranged in a second axis direction different from the first axis direction.

According to an aspect of the invention, the displaying method further comprises indicating information on a rank of the upper item data for all received upper item data in one area of the UI picture.

According to an aspect of the invention, the displaying method further comprises, if there exist other upper item data, which are not indicated in the UI, of the stored parental rating definition-related data, indicating a first extension indicating item informing the existence of the other upper item data and having (+) or (−) direction of the first axis.

According to an aspect of the invention, the displaying method further comprises, when an extension instruction of the upper item data is input, indicating next upper item data corresponding to the input in the first axis direction and arranging and indicating lower item data corresponding to the indicated upper item data in the second axis direction.

According to an aspect of the invention, the displaying method further comprises, if there exist other lower item data, which are not currently indicated in the UI, of the lower item data corresponding to the upper item data indicated in the UI, indicating a second extension indicating item informing the existence of the other upper item data and having (+) or (−) direction of the second axis.

According to an aspect of the invention, the displaying method further comprises, when an extension instruction of the lower item data is input, arranging and indicating next lower item data corresponding to the input in the second axis direction.

According to an aspect of the invention, the displaying method further comprises indicating detailed information on lower item data directed according a predetermined input.

According to an aspect of the invention, the upper item data comprise dimension values and the lower item data comprise rating values, and when viewing block or allowance of the rating values indicated in the UI picture is selected, setting the selected viewing block or allowance of the rating values.

According to an aspect of the present invention, there is provided a broadcasting receiving apparatus comprising: a broadcasting receiver for receiving downloadable parental rating definition-related data; a data storage for storing upper item data of the parental rating definition-related data and lower item data corresponding to the upper item data; a UI generator for generating a UI for parental lock setup; and a controller for controlling the UI generator to generate the UI with upper item data, which are selected from the stored upper item data, indicated in a first area of the UI and with lower item data, which belong to the selected upper item data, arranged in one direction.

According to an aspect of the invention, the controller controls the UI generator to indicate information on a rank of the indicated upper item data for all received upper item data in a second area of the UI.

According to an aspect of the invention, if upper item data other than the upper item data currently indicated in the UI are stored in the data storage, the controller controls the UI generator to indicate a first extension indicating item informing the existence of the other upper item data in an area adjacent to the first area.

According to an aspect of the invention, if there exist other lower item data, which are not indicated in the UI, of the lower item data corresponding to the upper item data currently indicated in the UI, the controller controls the UI generator to indicate a second extension indicating item informing the existence of the other upper item data.

According to an aspect of the invention, the lower item data are arranged in a vertical direction, and the first extension indicating item is indicated to have (+)/(−) directionality of a horizontal axis and the second extension indicating item is indicated to have (+)/(−) directionality of a vertical axis.

According to an aspect of the invention, the broadcasting receiving apparatus further comprises a user input unit for directing and/or selecting items indicated in the UI, wherein the user input unit comprises top/bottom/left/right extension keys.

According to an aspect of the invention, the left/right extension keys are selected, the controller controls the UI generator to indicate next upper item data corresponding to the selection in the first area and arrange and indicate lower item data corresponding to the indicated upper item data in the vertical direction.

According to an aspect of the invention, when top/bottom extension keys are selected, the controller controls the UI generator to arrange and indicate next lower item data corresponding to the selection in the vertical direction.

According to an aspect of the invention, the upper item data comprise dimension values and the lower item data comprise rating values.

BRIEF DESCRIPTION OF THE DRAWINGS

The above and/or other aspects of the present invention will become apparent and more readily appreciated from the following description of the exemplary embodiments, taken in conjunction with the accompanying drawings of which:

FIG. 2 is a view showing a RRT related to parental rating definition included in a transmitted broadcasting signal;

DETAILED DESCRIPTION OF THE
EXEMPLARY EMBODIMENTS OF THE
INVENTION

Reference will now be made in detail to exemplary embodiments of the present invention, examples of which are illustrated in the accompanying drawings.

Figure 1:
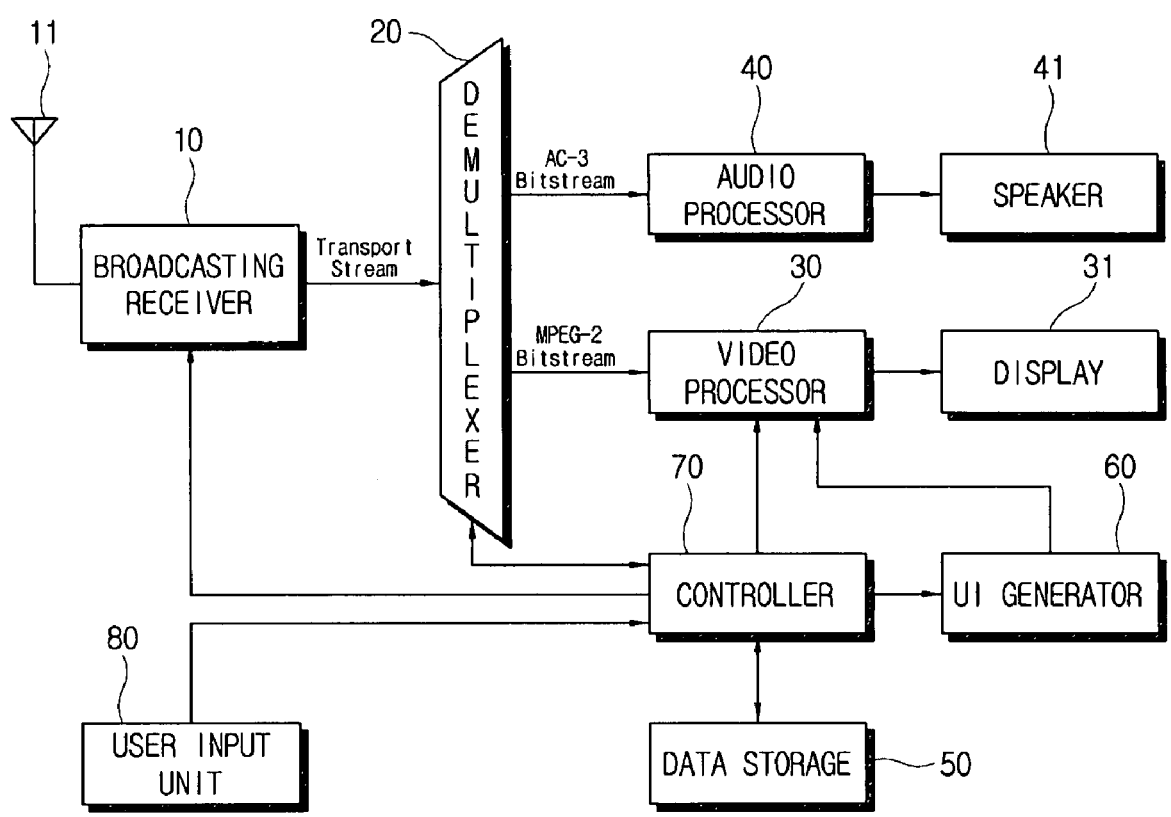
FIG. 1 is a schematic block diagram of a TV according to an exemplary embodiment of the present invention.

FIG. 1 is a schematic block diagram of a television (TV) according to an exemplary embodiment of the present invention. A case where the TV according to the exemplary embodiment of the present invention processes digital broadcasting signals according to the ATSC will be described by way of example.

As shown in FIG. 1, the TV according to the exemplary embodiment of the present invention includes a broadcasting receiver 10, a demultiplexer 20, a video processor 30, a display 31, an audio processor 40, a speaker 41, a data storage 50, a UI generator 60, and a controller 70.

A digital broadcasting signal is transmitted in the form of a transport stream packetized by time division-multiplexing of a video signal, an audio signal and additional data.

The broadcasting receiver 10 receives broadcasting signals from an outside source via an antenna 11 and may include a tuner for tuning a broadcasting signal having a corresponding frequency of a particular channel band according to a tuning control signal from the controller 70, which will be described later, and a demodulator for outputting the tuned broadcasting signal in the form of the transport stream through a vestigial sideband (VSB) demodulation process, an error correction process, etc.

In addition, the demultiplexer 20 separates the broadcasting signal received in the broadcasting receiver 10 into the video signal, the audio signal and various additional data defined by program and system information protocol (PSIP) information, which are output in the form of a bit stream.

The video signal from the demultiplexer 20 is processed by the video processor 30 and displayed on the display 31. The video processor 30 includes an MPEG-2 decoder and a scaler for scaling the video signal to meet a vertical frequency, resolution, picture ratio and so on according to an output format of the display 31.

The display 31 may include various kinds of display modules such as a Digital Light Processing (DLP), a Liquid Crystal Display (LCD), a Plasma Display Panel (PDP) and so on.

The audio signal is processed by the audio processor 40 and then outputted to the speaker 41. The audio processor 40 may include an AC-3 decoder.

Downloadable parental rating definition-related RRT information included in the additional data defined by the PSIP information and output from the demultiplexer 20 is stored in the data storage 50 under control of the controller 70, which will be described later. The data storage 50 may be implemented by an electrically erasable programmable read-only memory (EEPROM).

The RRT information included in the broadcasting signal may be divided for transmission into upper item data and lower item data corresponding to the upper item data, which will be described below with reference to FIG. 2.

As shown in FIG. 2, the RRT information has one or more independent dimension values as the upper item data and rating values as the lower item data, which belong to respective dimensions. A maximum of 41 (255, in theory) dimension values and a maximum of 15 rating values may be transmitted.

The upper item data include text data related to names of the dimension values and the lower item data include text data related to names of the rating values that belong to the respective dimensions and so on. The rating values correspond to ratings according to which a viewer sets a parental lock function. In this way, the RRT information included in the additional data defined by the Program and System Information Protocol (PSIP) information may be variable and stored in the data storage 50 every time it is received.

In this exemplary embodiment, the UI generator 60 generates UI data for parental lock setting using the RRT information stored in the data storage 50 under control of the controller 70, which will be described later, and may be implemented by an On Screen Display (OSD) generating IC.

The UI data generated by the UI generator 60 are scaled by the video processor 30 and then displayed on the display 31. A UI picture may be displayed on some or all of the region of the display 31, and may be displayed in combination with a video signal of a currently tuned channel as the case may be.

The UI data generated by the UI generator 60 will be described in detail below with reference to FIG. 3.

Figure 3:
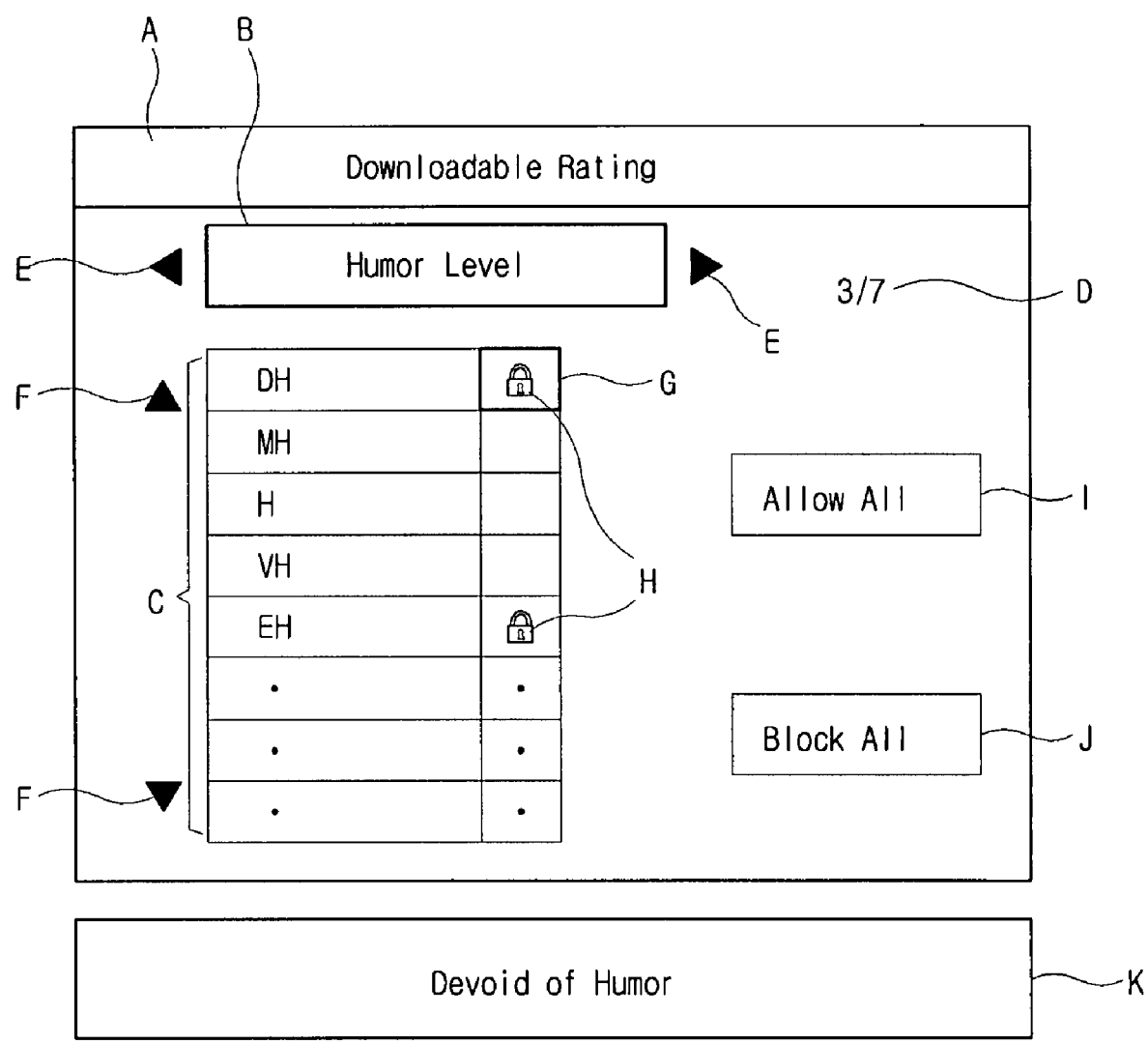
FIG. 3 is a UI picture for parental lock setting according to an exemplary embodiment of the present invention.

As shown in FIG. 3, a name of Downloadable U.S. Regional Rating System, for example, "Downloadable Rating," is inserted into an area A of the UI picture. This name is indicated as text data transmitted from broadcasters. Accordingly, data indicated in the area A may vary depending on the transmitted text data. In addition, an indicating highlight may be placed in the area A.

A name of a dimension value is indicated in an area "B." This name is also indicated as text data according to the received RRT information and may vary depending on a dimension value. In addition, rating values as the lower item data corresponding to the dimension value indicated in the area "B" are indicated in an area "C."

A maximum of 15 rating values that belong to one dimension may be transmitted, as described above, and these rating values are sequentially arranged in a vertical direction. The rating values may be all indicated in one page. Alternatively, the rating values may be partially indicated and changed to indication of subsequent rating values using an extension key or the like, which will be described. In this exemplary embodiment, 8 rating values indicated in one page are exemplified.

In addition, in this exemplary embodiment, the UI has an area "D" where rank information of currently indicated dimension for all the received dimensions, such as "3/7," is indicated. The rank information used herein means a position of a current dimension for all the received dimensions. More specifically, "3/7" indicated in FIG. 3 means that the total number of all the received dimensions is 7 and the current dimension is the third of all the received dimensions. Accordingly, the rank information varies depending on the number of transmitted dimensions and which dimension is selected.

A user can know the total number of all the dimensions and the position of the current indicated dimension in all the dimensions from such rank information. In some cases, the rank information may be page information informing a position of a current UI of all UI pictures which may be produced depending on the number of received dimensions.

In addition, in this exemplary embodiment, the UI may contain an extension indicating item to allow a user to extend dimension values and rating values. "E" and "F" shown in FIG. 3 are examples of the extension indicating item. The term "extension" used herein means that a current picture is changed to a picture having a next dimension value and a next rating value.

As a first extension indicating item to allow the user to extend the dimension values, "E" is indicated to have horizontal directionality coincident with an indication direction of the dimension values, that is, directionality of positive and negative, in a horizontal axis. For example, assuming that the number of all the transmitted dimensions is 7 and a dimension indicated on the UI picture is the first of all the transmitted dimensions, a left (−) extension indicating item is not indicated, but a right (+) extension indication item is only indicated. From this, the user can know that the dimension values are extensible in the right (+) direction. In other words, when a right (+) extension function of the dimension values is input, the UI picture having a current dimension value is changed to a picture having a next dimension value.

As an alternative, the dimension extension function may be recursive. For example, assuming that the number of all the transmitted dimensions is 7, if a dimension indicated on the UI picture is the last seventh of all the transmitted dimensions, the UI picture may be changed to a picture having the first dimension value when the right (+) extension function is input. If the dimension indicated on the UI picture is the first of all the transmitted dimensions, the UI picture may be changed to a picture having the last seventh dimension value when the left (−) extension function is input.

As a second extension indicating item to allow the user to extend the dimension values, "F" is indicated to have vertical directionality coincident with an array direction of the rating values, that is, (+) and (−) directionality of a vertical axis. For example, assuming that the number of rating values which belong to a currently indicated dimension is 12, 8 rating values can be indicated in one page, and rating values indicated in the UI picture lie in one page, the second extension indicating item is not indicated in an upward (+) direction, but a downward (−) direction is only indicated.

From this, the user can know that the rating values are extensible in the downward (−) direction. In other words, when a downward (−) extension function of the dimension values is input, the UI picture having current rating values is changed to a picture of a page having next rating values.

As another alternative, the rating value extension function may be recursive like the above-described dimension extension function. For example, assuming that the number of all the transmitted rating values is 12, if 8 rating values are indicated in a first page and 7 rating values are indicated in a second page, the rating values are recursive when the upward (+) extension function or the downward (−) extension function is input, and accordingly, the UI picture is changed to a picture of a page having next rating values.

In this manner, the UI picture is configured such that the dimension values are indicated in the horizontal direction and the rating values are indicated in the vertical direction, that is, the dimension values are perpendicular to the rating values. In addition, both the dimension values and the rating values have extensibility, and their extension directions coincide with respective indication and array directions and are perpendicular to each other. From this, the user can recognize and coordinate parental rating definition-related data conveniently without difficulty As shown in FIG. 3, area C is divided into two columns. The left column may indicate names of rating values transmitted from broadcasters, for example, "DH," "MH," "H," "VH," "EH," etc. The right column item may indicate items for setting a rating value as a viewing block or allowance.

Further, an indicating highlight, denoted by "G," may be placed in the area "C," and an icon, denoted by "H," directing the viewing block, is indicated according to the input of the user. Indication of a padlock-shaped icon as denoted by "H" means viewing lock corresponding to a certain rating value, and a rating value having no icon means viewing allowance. Of course, icons indicating viewing lock and allowance may be implemented by different shapes.

If the rating values have an age-order relation, for example, "allow for above 12 years of age," "allow for above 15 years of age," "allow for above 18 years of age," etc., when the user chooses "allow for above 15 years of age," a broadcasting program having the next rating of "allow for above 18 years of age" is also viewable.

In addition, in this exemplary embodiment, the UI picture contains an "Allow All" item, denoted by "I," and a "Block All," denoted by "J," to select all rating values that belong to an indicated dimension value as viewing block and viewing allowance, respectively.

In addition, detailed information on a rating value at which a current indicating highlight is placed is indicated in a separate area "K." For example, if an indicating highlight is placed at a set item corresponding to "DH" in FIG. 3, "Devoid of Humor" as detailed information corresponding to "DH" is indicated in the area "K." Accordingly, the user may move the indicating highlight to know detailed information on a desired rating value. That is, brief information on rating values included in the RRT information is indicated in the area "C," while detailed information on a selected rating value is indicated in the area "K."

In this exemplary embodiment, upon receiving the RRT information, the controller 70 stores the received RRT information in the data storage 50, provides the RRT information stored in the data storage 50 to the UI generator 60 when a parental lock function is selected by a user, and controls the UI generator 60 to generate the above-described UI data. The controller 70 may be implemented by a controller such as a microcomputer or a microcontroller unit (MCU).

In this exemplary embodiment, the TV may further include a user input unit 80 through which a parental lock function is selected by a user and items of the UI picture are directed or selected by the user. The user input unit 80 may be provided as a remote controller or buttons on a display panel, including top/bottom/left/right extension keys, a setup key, etc.

If the UI picture is displayed, the controller 70 moves an indicating highlight indicated on the UI picture according to a selective input through the user input unit 80 and controls the UI generator 60 to indicate other dimensions and other rating values in response to press of the top/bottom/left/right extension keys, which will be described in more detail later.

Figure 4:
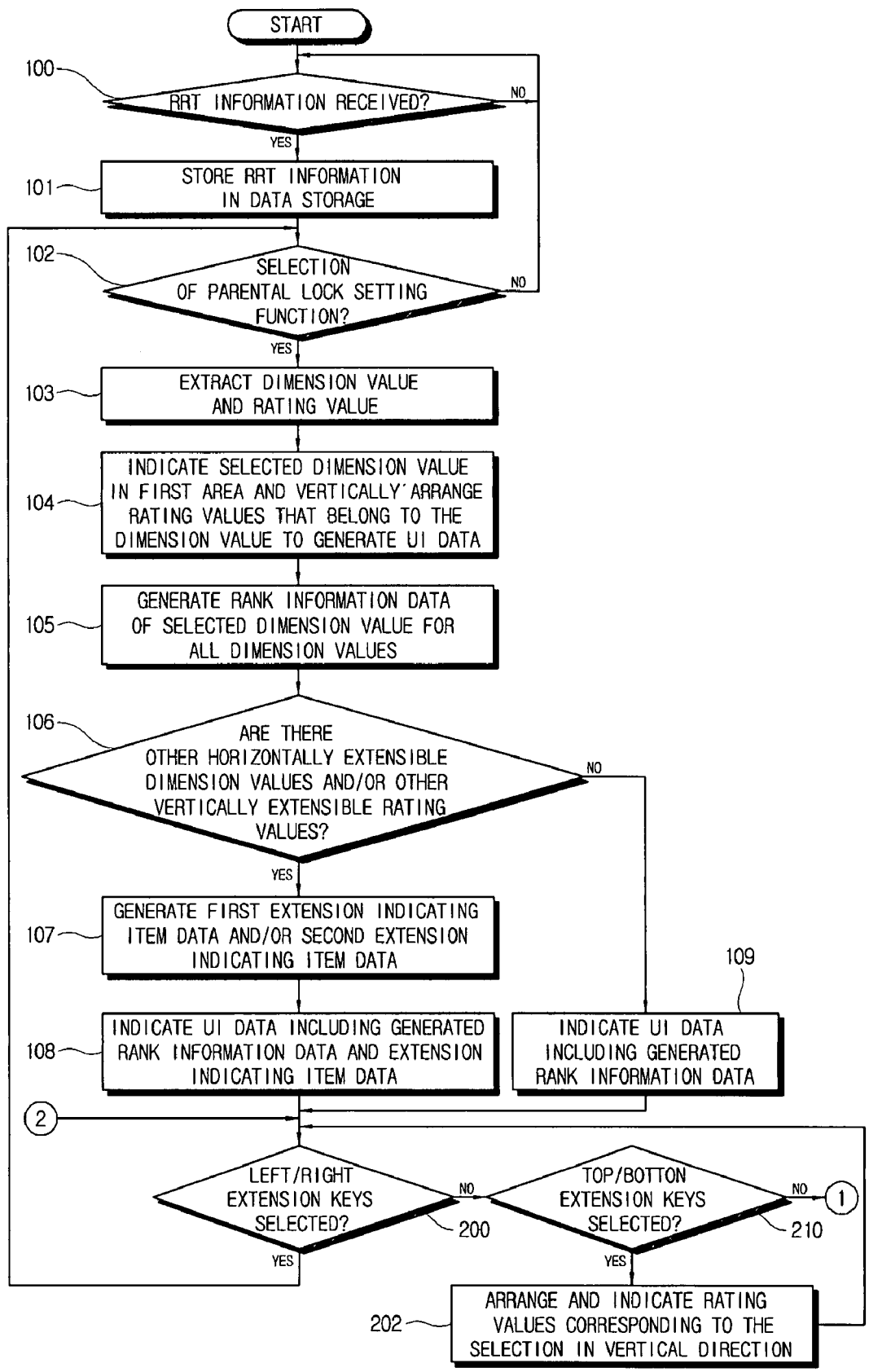
FIGS. 4 and 5 are flow charts illustrating a UI displaying method for parental lock setting according to an exemplary embodiment of the present invention.
Figure 5:
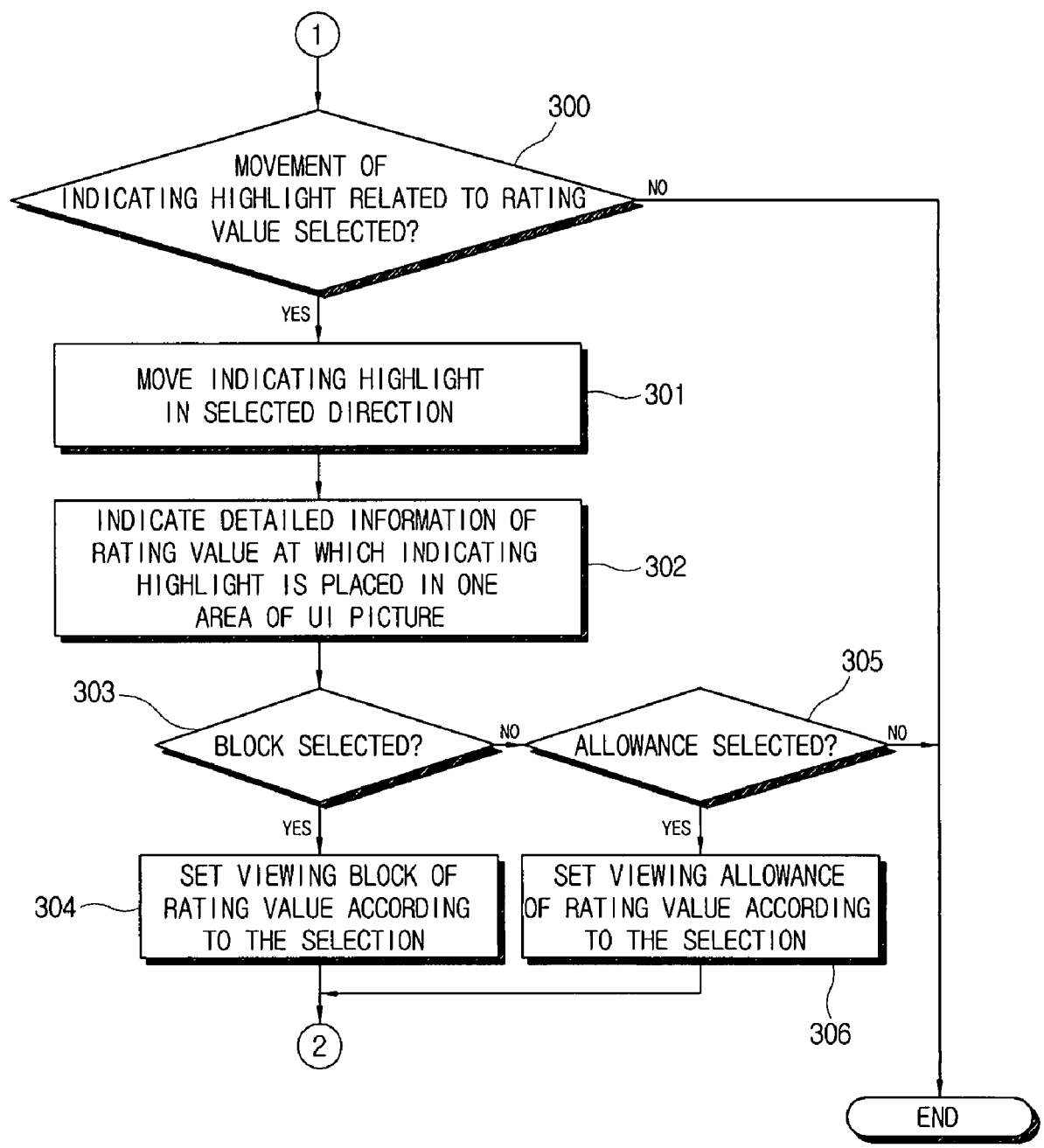

FIGS. 4 and 5 are flow charts illustrating a UI displaying method for parental lock setting according to an exemplary embodiment of the present invention.

Referring to FIG. 4, upon receiving RRT information at operation 100, the controller 70 stores the received RRT information in the data storage 50 at operation 101.

Next, when a parental lock function is selected through the user input unit 80 at operation 102, the controller 70 extracts parental rating definition-related data, that is, dimension values and rating values, which are stored in the data storage 50 at operation 103. Next, the controller 70 provides a selected dimension value and rating values that belong to the dimension value to the UI generator 60 such that the UI generator 60 indicates the selected dimension value in the area "B" as a first area in FIG. 3 and vertically arrange and indicate the rating values that belong to the dimension value to generate UI data at operation 104.

Next, the controller 70 confirms a rank of the selected dimension value for all received dimension values from the parental rating definition-related data stored in the data storage 50 and controls the UI generator 60 to generate rank information data at operation 105.

Next, the controller 70 confirms whether the selected dimension value is extensible in the left and right direction and whether the rating values that belong to the dimension are extensible in the top/bottom direction at operation 106, and, if it is confirmed that the dimension value and the rating values are extensible, controls the UI generator 60 to generate extension indication item data at operation 107.

Next, the UI data including the rank information data and the extension indication item data generated by the UI generator 60 are provided to the video processor 30 and are displayed in the UI picture on the display 31 after being subjected to a scaling process by the video processor 30 at operation 108.

If one dimension value is transmitted and all rating values that belong to the dimension value can be indicated in one UI picture, the UI data are displayed on the display 31 without extension indication items at operation 109.

Accordingly, the user can know from the rank information and the extension indication items indicated in the UI picture whether there exists data not displayed on the UI picture, and change the UI picture using the top/bottom/left/right extension keys of the user input unit 80 if he wants indication of other data.

If the left/right extension keys of the user input unit 80 are selected at operation 200, the controller 70 extracts a dimension value and rating values that belong to the dimension value from the data storage 50 in response to the selection, and controls the UI generator 60 to change the UI picture through the above-described procedures at operations 103 to 109. Accordingly, the user can see dimension values and rating values other than the information indicated in a current UI picture.

If the top/bottom extension keys of the user input unit 80 are selected at operation 201, in response to the selection, the controller 70 controls the UI generator 60 to arrange and indicate next rating values in a vertical direction at operation 202. Such selection by the top/bottom/left/right extension keys may be performed depending on whether an extension indicating item is indicated. That is, a function of changing the UI picture in response of the selection by the top/bottom/left/right extension keys may not be performed in a condition where the extension indicating item is not indicated.

Referring to FIG. 5, when movement of an indicating highlight indicating a rating value is selected through the user input unit 80 at operation 300, in response to the selection, the controller 70 moves the indicating highlight in a selected direction at operation 301 and controls the UI generator 60 to indicate the rating value.

Next, the controller 70 extracts detailed information of the rating value at which the indicating highlight is placed, and provides the extracted information to the UI generator 60 to indicate the information in the area "K" of the UI picture shown in FIG. 3 at operation 302. Accordingly, the user can know the detailed information of the rating value, thereby allowing the user to select the viewing block or allowance.

If the block of the rating value is selected at operation 303, the controller 70 sets the rating value to be a viewing block rating in response to the selection at operation 304. On the contrary, if the allowance of the rating value is selected at operation 305, the controller 70 sets the rating value to be a viewing allowance rating in response to the selection at operation 306, that is, releases setting of the viewing block rating.

Upon completing the viewing block setting through the above-described procedures, the controller 70 compares viewing rating information of a broadcasting program corresponding to a channel selected subsequently to the preset viewing block ratings, and determines whether viewing of the broadcasting program is blocked. For example, if "DH" in FIG. 3 is set as a viewing block, the broadcasting program is interrupted if the viewing rating of the selected channel corresponds to "DH," and, if not so, an image of a video signal of the channel is displayed on the display.

In this exemplary embodiment, accordingly, it is possible to provide a UI having a structure where dimension values and rating values are perpendicular to each other and their extension directions coincide with respective indication and array directions, thus allowing the user to set a viewing block function without difficulty and conveniently.

Although it has been illustrated in this exemplary embodiment that one dimension value is indicated in one UI picture, it may be configured to arrange and indicate a plurality of dimension values in a horizontal direction and allow the user to select a desired one of the dimension values by moving an indicating highlight through the user input unit 80 and know rating values that belong to the selected dimension value.

In addition, although it has been illustrated in this exemplary embodiment that the dimension values are indicated in the horizontal direction and the rating values are arranged and indicated in the vertical direction, it is to be understood that the dimension values may be arranged and indicated in the vertical direction and the rating values may be indicated in the horizontal direction.

In addition, although the TV has been exemplified as the broadcasting receiving apparatus, the exemplary embodiments of the present invention are applicable to all apparatuses having a broadcasting receiving function such as a set-top box.

As apparent from the description, the present invention provide a broadcasting receiving apparatus, which is capable of facilitating users' recognition of parental rating definition-related data transmitted along with broadcasting signals and more conveniently setting a parental lock function according to the parental rating definition-related data, and a displaying method of a user interface for setting the parental lock function.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcasting receiving apparatus comprising:
    a broadcasting receiver which receives parental rating definition-related data comprising upper item data indicating characteristics of broadcast program content, and lower item data indicating ratings of the characteristics;
    a data storage which stores the parental rating definition-related data;
    a UI generator which generates a user interface (UI) for parental lock setup; and
    a controller which controls the UI generator to arrange the upper item data of the parental rating definition-related data in a first axis direction of the UI and arrange the lower item data corresponding to the upper item data in a second axis direction which is different from the first axis direction,
    wherein the controller controls the UI generator to indicate information on a rank of the upper item data with respect to all received upper item data in a first area of the UI,
    wherein the first axis comprises a horizontal axis, the second axis comprises a vertical axis, the upper item data comprise dimension values with respect to the broadcast program content, and the lower item data comprise rating values with respect to the broadcast program content, and
    wherein the controller controls the UI generator to indicate items for selecting a viewing block or an allowance of the rating values indicated in the UI, and set a viewing block function in response to a rating value with the viewing block or allowance selected through a user input unit operable to direct or select the items indicated in the UI.

2. The broadcasting receiving apparatus according to claim 1, wherein, if there exist other upper item data, which are not indicated in the UI, of the stored parental rating definition-related data, the controller controls the UI generator to indicate a first extension indicator informing the existence of the other upper item data and having a positive or negative direction of the first axis.

3. The broadcasting receiving apparatus according to claim 2 further comprising a user input unit operable to direct or select items indicated in the UI.

4. The broadcasting receiving apparatus according to claim 3, wherein, if an extension of the upper item data is selected through the user input unit, the controller controls the UI generator to indicate next upper item data corresponding to the selection in the first axis direction and arrange and indicate lower item data corresponding to the indicated upper item data in the second axis direction.

5. The broadcasting receiving apparatus according to claim 3, wherein, if an extension of the lower item data is selected through the user input unit, the controller controls the UI generator to arrange and indicate next lower item data corresponding to the selection in the second axis direction.

6. The broadcasting receiving apparatus according to claim 5, wherein the controller controls the UI generator to indicate detailed information on lower item data directed by the user input unit in a second area of the UI.

7. The broadcasting receiving apparatus according to claim 1, wherein, if there exist other lower item data, which are not indicated in the UI, of the lower item data corresponding to the upper item data indicated in the UI, the controller controls the UI generator to indicate a second extension indicator informing the existence of the other upper item data and having positive or negative direction of the second axis.

8. The broadcasting receiving apparatus according to claim 7 further comprising a user input unit operable to direct or select items indicated in the UI.

9. The broadcasting receiving apparatus according to claim 8, wherein, if an extension of the upper item data is selected through the user input unit, the controller controls the UI generator to indicate next upper item data corresponding to the selection in the first axis direction and arrange and indicate lower item data corresponding to the indicated upper item data in the second axis direction.

10. The broadcasting receiving apparatus according to claim 8, wherein, if an extension of the lower item data is selected through the user input unit, the controller controls the UI generator to arrange and indicate next lower item data corresponding to the selection in the second axis direction.

11. The broadcasting receiving apparatus according to claim 10, wherein the controller controls the UI generator to indicate detailed information on lower item data directed by the user input unit in a second area of the UI.

12. The broadcasting receiving apparatus according to claim 11, wherein the first axis comprises a horizontal axis and the second axis comprises a vertical axis, and wherein the upper item data comprise dimension values and the lower item data comprise rating values.

13. The broadcasting receiving apparatus according to claim 12, wherein the controller controls the UI generator to indicate items for selecting a viewing block or allowance of the rating values indicated in the UI, and set a viewing block function in response to a rating value with the viewing block or allowance selected through the user input unit.

14. The broadcasting receiving apparatus according to claim 1, wherein the controller controls the UI generator to indicate items for selecting a viewing block or an allowance of the rating values indicated in the UI, and set a viewing block function in response to a rating value with the viewing block or allowance selected through a user input unit operable to direct or select items indicated in the UI.

15. The broadcasting receiving apparatus according to claim 1, wherein the parental rating definition-related data comprises rating region tables (RRTs) included in program specific information protocol (PSIP) complying with the Advanced Television Systems Committee (ATSC) standard.

16. A displaying method of a user interface (UI) for setting a parental lock, the method comprising:
  storing downloadable parental rating definition-related data comprising upper item data indicating characteristics of broadcast program content, and lower item data indicating ratings of the characteristics;
  displaying a UI picture with the upper item data of the parental rating definition-related data arranged in a first axis direction of a UI picture and with the lower item data corresponding to the upper item data arranged in a second axis direction which is different from the first axis direction;
  indicating information on a rank of the upper item data with respect to all received upper item data in a first area of the UI picture; and
  indicating items for selecting a viewing block or an allowance of the rating values indicated in the UI, and setting a viewing block function in response to a rating value with the viewing block or allowance selected through a user input unit operable to direct or select the items indicated in the UI,
  wherein the first axis comprises a horizontal axis, the second axis comprises a vertical axis, the upper item data comprise dimension values with respect to the broadcast program content, and the lower item data comprise rating values with respect to the broadcast program content.

17. The displaying method according to claim 16 further comprising, if there exist other upper item data, which are not indicated in the UI, of the stored parental rating definition-related data, indicating a first extension indicator informing the existence of the other upper item data and having positive or negative direction of the first axis.

18. The displaying method according to claim 17 further comprising, if an extension instruction of the upper item data is input, indicating next upper item data corresponding to the input in the first axis direction and arranging and indicating lower item data corresponding to the indicated upper item data in the second axis direction.

19. The displaying method according to claim 18 further comprising, if there exist other lower item data, which are not indicated in the UI, of the lower item data corresponding to the upper item data indicated in the UI, indicating a second extension indicator informing the existence of the other upper item data and having positive or negative direction of the second axis.

20. The displaying method according to claim 19 further comprising, if an extension instruction of the lower item data is input, arranging and indicating next lower item data corresponding to the input in the second axis direction.

21. The displaying method according to claim 20 further comprising indicating detailed information on lower item data directed according an input.

22. The displaying method according to claim 20, wherein the upper item data comprise dimension values and the lower item data comprise rating values, and if a viewing block or allowance of the rating values indicated in the UI picture is selected, setting the selected viewing block or allowance of the rating values.

23. The displaying method according to claim 16 further comprising, if there exist other lower item data, which are not indicated in the UI, of the lower item data corresponding to the upper item data indicated in the UI, indicating a second extension indicator informing the existence of the other upper item data and having positive or negative direction of the second axis.

24. The displaying method according to claim 23 further comprising, if an extension instruction of the lower item data is input, arranging and indicating next lower item data corresponding to the input in the second axis direction.

25. The displaying method according to claim 24 further comprising indicating detailed information on lower item data directed according an input.

26. The displaying method according to claim 24, wherein the upper item data comprise dimension values and the lower item data comprise rating values, and if a viewing block or allowance of the rating values indicated in the UI picture is selected, setting the selected viewing block or allowance of the rating values.

27. The displaying method according to claim 16, wherein the parental rating definition-related data comprises rating region tables (RRTs) included in program specific information protocol (PSIP) complying with the Advanced Television Systems Committee (ATSC) standard.

28. A broadcasting receiving apparatus comprising:
a broadcasting receiver which receives parental rating definition-related data comprising upper item data indicating characteristics of broadcast program content, and lower item data indicating ratings of the characteristics;
a data storage which stores upper item data of the parental rating definition-related data and lower item data corresponding to the upper item data;
a user interface (UI) generator which generates a UI for parental lock setup; and
a controller which controls the UI generator to generate the UI with upper item data, which are selected from the stored upper item data, arranged in a first area of the UI and with the lower item data, corresponding to the selected upper item data, arranged in one direction,
wherein the controller controls the UI generator to indicate information on a rank of the indicated upper item data with respect to all received upper item data in a second area of the UI,
wherein the first axis comprises a horizontal axis, the second axis comprises a vertical axis, the upper item data comprise dimension values with respect to the broadcast program content, and the lower item data comprise rating values with respect to the broadcast program content, and
wherein the controller controls the UI generator to indicate items for selecting a viewing block or an allowance of the rating values indicated in the UI, and set a viewing block function in response to a rating value with the viewing block or allowance selected through a user input unit operable to direct or select the items indicated in the UI.

29. The broadcasting receiving apparatus according to claim 28, wherein, if upper item data other than the upper item data currently indicated in the UI are stored in the data storage, the controller controls the UI generator to indicate a first extension indicator informing the existence of the other upper item data in an third area adjacent to the first area.

30. The broadcasting receiving apparatus according to claim 29, wherein the lower item data are arranged in a vertical direction, and wherein the first extension indicator is indicated to have positive and negative directionality of a horizontal axis and the second extension indicator is indicated to have positive and negative directionality of a vertical axis.

31. The broadcasting receiving apparatus according to claim 30, further comprising a user input unit used to select items indicated in the UI, wherein the user input unit comprises top, bottom, left and right extension keys.

32. The broadcasting receiving apparatus according to claim 31, wherein, if at least one of the left and right extension key is selected, the controller controls the UI generator to indicate next upper item data corresponding to the selection in the first area and arrange and indicate lower item data corresponding to the indicated upper item data in the vertical direction.

33. The broadcasting receiving apparatus according to claim 31, wherein, if at least one of the top and bottom extension key is selected, the controller controls the UI generator to arrange and indicate next lower item data corresponding to the selection in the vertical direction.

34. The broadcasting receiving apparatus according to claim 30, wherein the upper item data comprise dimension values and the lower item data comprise rating values.

35. The broadcasting receiving apparatus according to claim 28, wherein, if there exist other lower item data, which are not indicated in the UI, of the lower item data corresponding to the upper item data currently indicated in the UI, the controller controls the UI generator to indicate a second extension indicator informing the existence of the other upper item data.

36. The broadcasting receiving apparatus according to claim 35, wherein the lower item data are arranged in a vertical direction, and the first extension indicator is indicated to have positive and negative directionality of a horizontal axis and the second extension indicator is indicated to have positive and negative directionality of a vertical axis.

37. The broadcasting receiving apparatus according to claim 36, further comprising a user input unit used to select items indicated in the UI, wherein the user input unit comprises top, bottom, left and right extension keys.

38. The broadcasting receiving apparatus according to claim 37, wherein, if the at least one of the left and right extension key is selected, the controller controls the UI generator to indicate next upper item data corresponding to the selection in the first area and arrange and indicate lower item data corresponding to the indicated upper item data in the vertical direction.

39. The broadcasting receiving apparatus according to claim 37, wherein, if at least one of the top and bottom extension key is selected, the controller controls the UI generator to arrange and indicate next lower item data corresponding to the selection in the vertical direction.

40. The broadcasting receiving apparatus according to claim 36, wherein the upper item data comprise dimension values and the lower item data comprise rating values.

41. The broadcasting receiving apparatus according to claim 28, wherein the parental rating definition-related data comprises rating region tables (RRTs) included in program specific information protocol (PSIP) complying with the Advanced Television Systems Committee (ATSC) standard.

* * * * *